United States Patent
Conway

(10) Patent No.: US 8,370,132 B1
(45) Date of Patent: Feb. 5, 2013

(54) DISTRIBUTED APPARATUS AND METHOD FOR A PERCEPTUAL QUALITY MEASUREMENT SERVICE

(75) Inventor: Adrian E. Conway, Weston, MA (US)

(73) Assignee: Verizon Services Corp., Ashburn, VA (US)

( * ) Notice: Subject to any disclaimer, the term of this patent is extended or adjusted under 35 U.S.C. 154(b) by 1525 days.

(21) Appl. No.: 11/282,706

(22) Filed: Nov. 21, 2005

(51) Int. Cl.
| | |
|---|---|
| G10L 19/00 | (2006.01) |
| G10L 15/20 | (2006.01) |
| G10L 15/00 | (2006.01) |
| G10L 19/14 | (2006.01) |
| G10L 11/04 | (2006.01) |
| G10L 11/06 | (2006.01) |
| G10L 19/06 | (2006.01) |
| G10L 19/12 | (2006.01) |
| G10L 21/02 | (2006.01) |
| G10L 21/00 | (2006.01) |
| G10L 21/06 | (2006.01) |
| H04L 12/26 | (2006.01) |
| H04M 1/24 | (2006.01) |

(52) U.S. Cl. ............ 704/201; 704/200; 704/200.1; 704/205; 704/207; 704/208; 704/209; 704/210; 704/211; 704/214; 704/215; 704/219; 704/220; 704/221; 704/226; 704/227; 704/231; 704/233; 704/236; 704/270; 704/270.1; 704/275; 704/276; 370/252; 370/232; 370/386; 370/389; 379/1.03; 379/24

(58) Field of Classification Search ............... 704/200.1, 704/200, 226, 270, 220, 221, 236, 275, 270.1, 704/276, 201, 205, 207, 208, 209, 210, 211, 704/214, 215, 219, 227, 231, 233; 455/65.11; 370/241, 241.1, 249, 252, 232, 386, 389; 379/1.03, 24

See application file for complete search history.

(56) References Cited

U.S. PATENT DOCUMENTS

| | | | | |
|---|---|---|---|---|
| 6,002,762 | A  * | 12/1999 | Ramsden | 379/406.06 |
| 6,201,960 | B1 * | 3/2001 | Minde et al. | 455/424 |
| 6,577,996 | B1 * | 6/2003 | Jagadeesan | 704/236 |
| 6,819,924 | B1 * | 11/2004 | Ma et al. | 455/425 |
| 6,965,597 | B1 * | 11/2005 | Conway | 370/389 |
| 7,164,771 | B1 * | 1/2007 | Treurniet et al. | 381/56 |
| 7,327,985 | B2 * | 2/2008 | Morfitt et al. | 455/67.11 |
| 7,406,419 | B2 * | 7/2008 | Malfait | 704/270 |
| 7,430,179 | B2 * | 9/2008 | Towns-von Stauber et al. | 370/252 |

(Continued)

OTHER PUBLICATIONS

Conway, A.E.; , "A passive method for monitoring voice-over-IP call quality with ITU-T objective speech quality measurement methods," Communications, 2002. ICC 2002. IEEE International Conference on , vol. 4, No., pp. 2583-2586 vol. 4, 2002.*

(Continued)

*Primary Examiner* — Edgar Guerra-Erazo

(57) ABSTRACT

Apparatus and methods are provided for measuring perceptual quality of a signal transmitted over a communication network, such as a circuit-switching network, packet-switching network, or a combination thereof. In accordance with one embodiment, a distributed apparatus is provided for measuring perceptual quality of a signal transmitted over a communication network. The distributed apparatus includes communication ports located at various locations in the network. The distributed apparatus may also include a signal processor including a processor for providing non-intrusive measurement of the perceptual quality of the signal. The distributed apparatus may further include recorders operatively connected to the communication ports and to the signal processor, wherein at least one of the recorders processes the signal at one of the communication ports and the recorder sends the signal to the signal processor to measure the perceptual quality of the signal.

13 Claims, 3 Drawing Sheets

U.S. PATENT DOCUMENTS

| | | | |
|---|---|---|---|
| 7,606,704 B2 * | 10/2009 | Gray et al. | 704/226 |
| 7,680,056 B2 * | 3/2010 | Keyhl et al. | 370/241 |
| 2002/0167936 A1 * | 11/2002 | Goodman | 370/352 |
| 2002/0167937 A1 * | 11/2002 | Goodman | 370/352 |
| 2002/0193999 A1 * | 12/2002 | Keane et al. | 704/270 |
| 2003/0171922 A1 * | 9/2003 | Beerends et al. | 704/233 |
| 2004/0030548 A1 * | 2/2004 | El-Maleh et al. | 704/230 |
| 2004/0153315 A1 * | 8/2004 | Reynolds et al. | 704/208 |
| 2006/0093094 A1 * | 5/2006 | Xing et al. | 379/1.02 |
| 2006/0166624 A1 * | 7/2006 | Van Vugt | 455/67.11 |
| 2006/0252376 A1 * | 11/2006 | Fok et al. | 455/67.13 |
| 2007/0011006 A1 * | 1/2007 | Kim | 704/233 |

OTHER PUBLICATIONS

Conway, A.E.;, "Output-based method of applying PESQ to measure the perceptual quality of framed speech signals," Wireless Communications and Networking Conference, 2004. WCNC. 2004 IEEE, vol. 4, No., pp. 2521-2526 vol. 4, Mar. 21-25, 2004.*

L.Sun, and E.C. Ifeachor, "Perceived Speech Quality Prediction for Voice Over IP-Based Networks," IEEE International Conference on Communications (ICC 2002). vol. 4, pp. 2573-2577, 2002.*

A.D. Clark, "Modeling the Effects of Burst Packet Loss and Recency on Subjective Voice Quality," 2nd IP-Telephony Workshop, Columbia University, New York, Apr. 2001.*

International Telecommunication Union, Single ended method for objective speech quality assessment in narrow-band telephony applications, Series P Telephone Transmission Quality, Telephone Installations, Local Line Networks, May 2004, 73 pp., p. 563.

Opticom GmbH, 3SQM™, Advanced Non-Intrusive Voice QualityTesting, 2003, 20 pp., Opticom White Paper, Erlangen, Germany.

* cited by examiner

Figure 1 -- Prior Art --

DISTRIBUTED APPARATUS AND METHOD FOR A PERCEPTUAL QUALITY MEASUREMENT SERVICE

BACKGROUND

As communication networks are becoming more heterogeneous, signal quality of calls over communication networks, or the "call quality," is a factor of increasing concern to network operators. The communication networks continue to evolve toward a combination of circuit-switching, packet-switching, and various access methods such as cable, digital subscriber line (DSL), cellular radio, wireless local area network (LAN), and broadband wireless. As this evolution continues, service providers, that is, operators of the communication networks, have greater interest in knowing and being able to quantify the end-to-end call quality over the networks.

Operators may use call quality as a quantitative measure to distinguish their service from that of competitors. Users are more likely to migrate toward service providers that provide better and/or more consistent call quality. Therefore, maintaining consistently high call quality is a factor for reducing turnover of users.

A network operator interested in maintaining good and consistent call quality may monitor and test one or more communication networks via non-intrusive signal quality assessment. Non-intrusive signal quality assessment is based on single-sided monitoring without generating traffic and without injecting a separate reference signal. Non-intrusive assessments may be performed by, e.g., human experts, signal processors, etc. FIG. 1 illustrates conventional non-intrusive signal quality assessments 140 and 160. Non-intrusive assessments 140 and 160 generate subjective mean opinion score 150 and objective mean opinion scores 170, respectively, to indicate levels of signal degradation after input signal 105 has traversed a communication network 110 into output signal 115.

Non-intrusive assessments 140 and 160 generate mean opinion scores 150 and 170 without a separate reference signal, e.g., input signal 105. A human expert may conduct non-intrusive assessment 140 by listening to a phone call with a test device (e.g., a conventional handset) connected in parallel to a phone line. Based on the expert's experience 120, expectation 125, and understanding of semantics 130, the expert may generate a subjective mean opinion score 150 on the perceptual quality of output signal 115. A signal processor may conduct non-intrusive assessment 160 by processing output signal 115. By using one or more processing methods (e.g., signal processing algorithms), the signal processor may generate an objective mean opinion score 170 on the perceptual quality of output signal 115.

Non-intrusive methods for objective measurement and assessment of perceptual quality include the ITU-T P.563 method (P.563 method) and the Single Sided Speech Quality Measure algorithm (3SQMTM). For more information on the ITU-T P.563 method, see "ITU-T P.563: Single ended method for objective speech quality assessment in narrow-band telephony applications," circulated on May 2004 by the International Telecommunication Union (ITU), the entire contents of which are incorporated herein by reference. For more information on 3SQM, see "3SQMTM: Advanced Non-Intrusive Voice Quality Testing," published 2003 by OPTICOM GmbH (OPTICOM), the entire contents of which are incorporated herein by reference.

One way for a user to objectively measure the perceptual quality of a voice call from any telephone terminal equipment (e.g., black phone, cell phone, internet protocol (IP) phone, computer, etc) is to dial into or connect to a P.563 server that makes non-intrusive perceptual quality measurements, speak a set of test sentences, and then view the results. An example of a P.563 web service is that provided by the 3SQM web-based server operated by OPTICOM.

OPTICOM presently operates two 3SQM servers, one located in Mountain View, Calif., and the other in Germany. However, OPTICOM's P.563 service generally requires the voice signal from a user's terminal to OPTICOM's server to traverse one or more long-distance communication networks, unless the user's terminal happens to be local to the server. The long distance communication networks may be based on circuit-switching, packet-switching, or a combination thereof. Therefore, the quality measurement obtained from OPTICOM's server may not accurately reflect the call quality that the users experience during local or regional calls.

Accordingly, there is a need for distributed apparatus and methods that measure the perceptual quality of a signal at various points of a communication network. It is desirable that such distributed apparatus and methods provide customers of telecommunications carriers and/or service providers the capability to make more accurate measurements of their call quality to any point in the network of the carriers or service providers.

DETAILED DESCRIPTION OF PREFERRED EMBODIMENTS

Reference will now be made in detail to preferred embodiments implemented according to the present invention(s), examples of which are illustrated in the accompanying drawings. Wherever possible, the same reference numbers will be used throughout the drawings to refer to the same or like parts.

The preferred apparatus and methods measure objective perceptual quality of signals transmitted through communication networks. Although apparatus and methods illustrate herein in terms of a telephony system, embodiments may be used with other types of signal transmission systems and networks.

Figure 1:
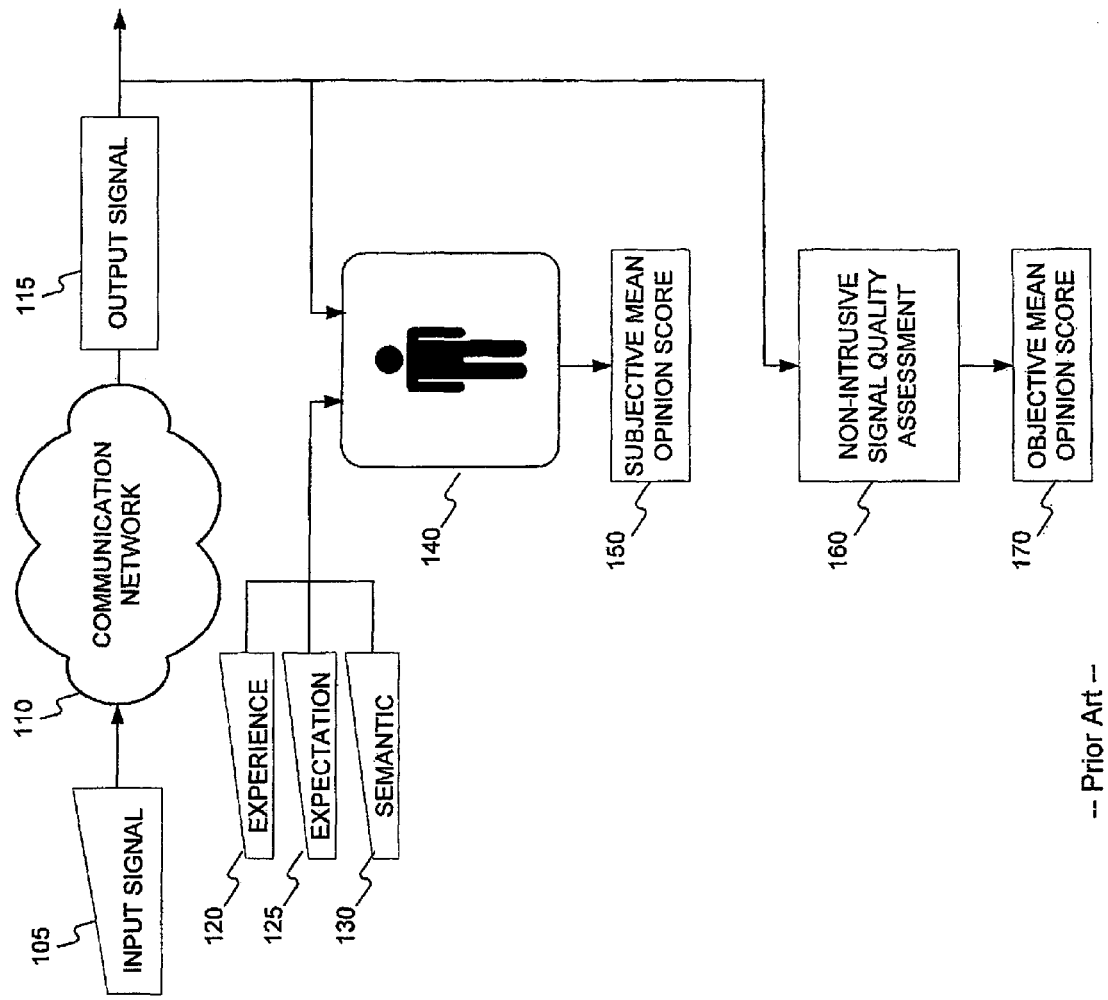
FIG. 1 illustrates conventional non-intrusive signal quality assessments.
Figure 2:
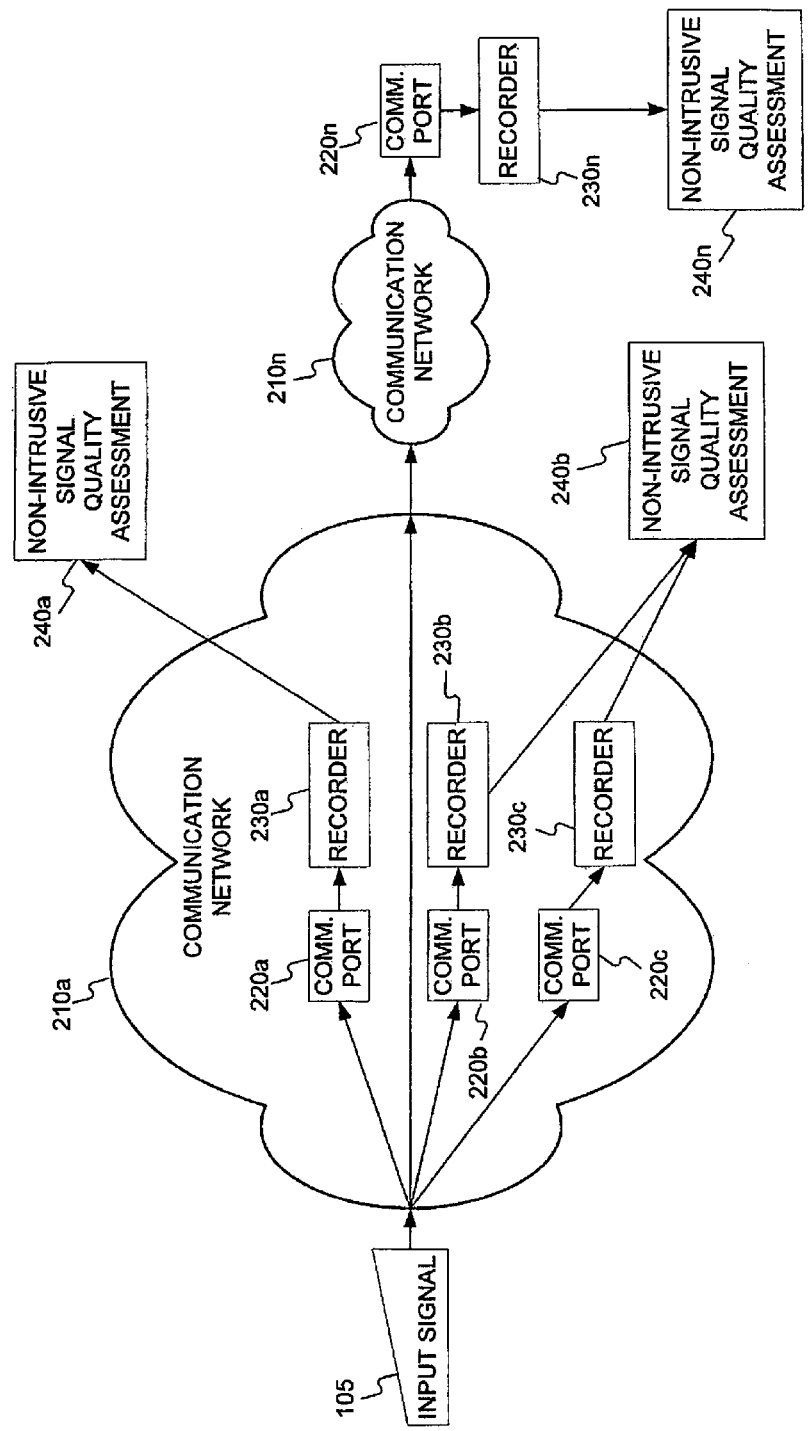
FIG. 2 is a diagram of an exemplary distributed apparatus for measuring perceptual quality of a signal transmitted over a communication network.

In an exemplary embodiment shown in FIG. 2, a distributed apparatus includes a set of known communication ports 220a-n (e.g., telephone ports, internet protocol (IP) ports, etc) located in or connected to communication networks 210a-n. A user may transmit input signal 105 to communication ports 220a-n from his terminal equipment (e.g., telephone terminal equipment, etc.). Communication ports 220a-n may be located at a plurality of locations in or connected to networks 210a-n.

Consistent with the invention, communication ports 220a-n may include physical or logical telephone ports located in, for instance, central office switches or tandem switches (regional, national, and/or international). Telephone ports may include cell phones. Communication ports 220a-n may also include logical or physical IP ports located at, for example, routers, switches, gateways, servers, or IP private branch exchanges (IP PBXs), that have a point-of-presence on an IP network. IP ports may include IP ports on IP cellular or wireless phones. Logically or physically attached to one or more of communication ports 220a-n is a device or process (e.g., recorders 230a-n) that processes and/or records input signal 105 transmitted by the user. Recorders 230a-n may exist physically or logically.

Recorders 230a-n process and/or record transmitted input signal 105 at communication ports 220a-n. Recorders 230a-n may process, in real-time, the transmitted signal by using a non-intrusive algorithm (e.g., single-sided method including the P.563 method, 3SQM, etc.) to provide an objective perceptual quality score for the transmitted signal. Alternatively, recorders 230a-n may record and send the transmitted signal as a file using a digital protocol (e.g., file transfer protocol (FTP), simple mail transfer protocol (SMTP), hypertext transfer protocol (HTTP), etc.) to non-intrusive quality assessment 240a-n. Non-intrusive quality assessment 240a-n may process the transmitted signal using a non-intrusive algorithm to provide an objective perceptual quality score. Non-intrusive quality assessment 240a-n may also send the transmitted signal as a file using a digital protocol to the user, the user then processes and determines the objective perceptual quality score of the transmitted signal using a non-intrusive algorithm.

With the above described distributed apparatus, a user may establish a communication connection with any one of a number of known communication ports. The user may establish multiple connections to different known communication points. The user may use the distributed apparatus to make more meaningful measurements than in conventional systems, since the plurality of communication ports in the circuit-switching and packet-switching portions of the communication network provides much better coverage compared to simply having only one or two measurement points in the communication network. In particular, the coverage may include the central office or the point-of-presence that is immediately local to the user. The user may use the distributed apparatus to better assess the quality of the local access part of the communication network.

Figure 3:
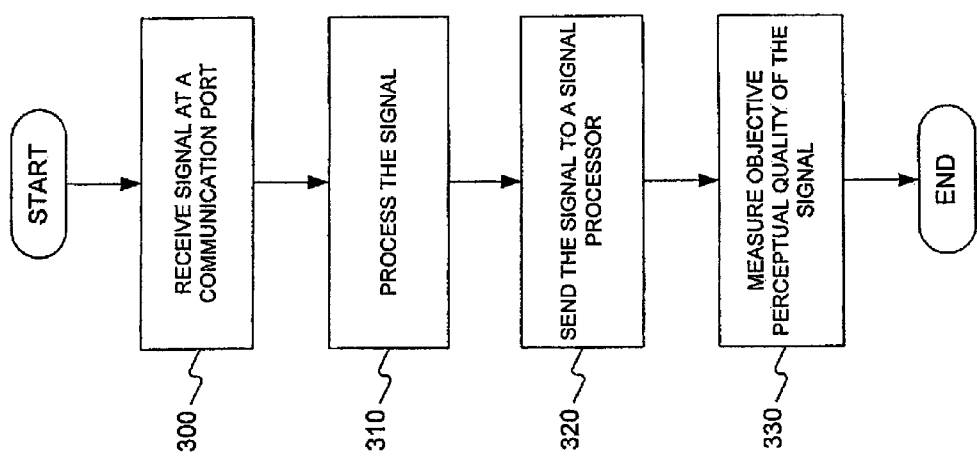
FIG. 3 shows a flow diagram of an exemplary method for measuring perceptual quality of a signal transmitted over a communication network.

FIG. 3 is an exemplary flow diagram of stages performed in a method for measuring objective perceptual quality of signals transmitted through communication networks. In stage 300, the distributed apparatus receives input signal 105 transmitted by the user into communication networks 210a-n. For example, the distributed apparatus may receive the transmitted signal at communication port 220b in communication network 210a. Next, in stage 310, the distributed apparatus processes and/or records the transmitted signal. For instance, recorder 230b may process and/or record the transmitted signal at communication port 220b. Recorder 230b may also process, in real-time, the transmitted signal to provide an objective perceptual quality score by using a non-intrusive algorithm (e.g., the P.563 method, 3SQM, etc.).

In stage 320, the distributed apparatus sends the transmitted signal received at one of communication ports 220a-n to a connected non-intrusive quality assessment 240a-n. For example, recorder 230b may record and send the transmitted signal as a file via a digital protocol (e.g., FTP, SMTP, HTTP, etc.) to non-intrusive quality assessment 240b. Non-intrusive quality assessment 240b may then, in stage 330, process the transmitted signal using a non-intrusive algorithm (e.g., the P.563 method, 3SQM, etc.) to provide an objective perceptual quality score to the user. Alternatively, recorder 230b may directly send the transmitted signal as a file via a digital protocol to the user for processing, or if recorder 230b sends the transmitted signal to non-intrusive quality assessment 240b, non-intrusive quality assessment 240b may also directly send the transmitted signal as a file using a digital protocol to the user. The user may then, in stage 330, process and determine the objective perceptual quality score of the transmitted signal using a non-intrusive method.

The foregoing descriptions have been presented for purposes of illustration and description. They are not exhaustive and do not limit the invention to the precise form disclosed. Modifications and variations are possible in light of the above teachings or may be acquired from practicing of the invention. For example, the described implementation includes a combination of software and hardware, but the present invention may be implemented in software alone or in firmware. Further, while certain exemplary methods have been described, it will be appreciated that the order of the method steps may be rearranged and stages or steps may be substituted, modified, combined or otherwise altered.

Other embodiments of the invention will be apparent to those skilled in the art from consideration of this specification and practice of the embodiments disclosed herein. Therefore, the specification and examples should be considered as exemplary only, with a true scope and spirit of the invention being indicated by the following claims.

What is claimed is:

1. An apparatus for measuring perceptual quality of a signal transmitted over a network, the apparatus comprising:
   a plurality of ports distributed at different locations within the network, the ports being configured to receive an input signal from a user terminal over the network and the user terminal located at a location remote from the ports;
   a signal processor configured to perform non-intrusive measurement of the perceptual quality of the input signal, the signal processor being disposed within the network at location remote from the ports; and
   a recorder located at a location remote from the signal processor and configured to receive, from the ports, the signal sent over the network, to record the signal sent over the network, and to send the recorded signal to the signal processor.

2. The apparatus of claim 1, wherein the signal processor is further configured to perform non-intrusive measurement of the perceptual quality of the recorded signal via one of the P.563 method and the Single Sided Speech Quality Measure algorithm ("3SQM").

3. The apparatus of claim 1, wherein the signal sent over the network comprises a voice signal and the signal processor comprises a processor providing single-ended measurement of objective perceptual quality of the voice signal.

4. The apparatus of claim 1, wherein the ports comprise cellular phones.

5. The apparatus of claim 1, wherein the ports comprise telephone ports located at one or more circuit switches.

6. The apparatus of claim 1, wherein the ports comprise IP ports on IP wireless phones.

7. A method for measuring perceptual quality of a signal transmitted over a communication network, the method comprising:
   receiving, at a port from a user terminal at a location remote from the port, an input signal sent over the network, the receiving port being one of a plurality of ports distributed at different locations within the network;
   recording, via a recorder at the receiving port, the input signal, the recorder being connected to the communication port and in communication with a signal processor at a location remote from the recorder;
   sending, via the recorder, the recorded signal to the signal processor; and measuring, via the signal processor, the objective perceptual quality of the recorded signal.

8. The method of claim 7, wherein measuring further comprises:
  measuring, via a single-ended algorithm, the objective perceptual quality of the recorded signal.

9. A system for measuring perceptual quality of a signal transmitted over a communication network, the system comprising:
  means for receiving, at a port from a user terminal at a location remote from the port, an input signal sent over the network, the receiving port being one of a plurality of ports distributed at different locations in the network;
  means for recording the input signal, the recording means being connected to the receiving port and in communication with a signal processor at a location remote from the recording means;
  means for sending the recorded signal from the recording means to the signal processor using a digital protocol; and
  means for measuring, via the signal processor, the objective perceptual quality of the recorded signal.

10. The system of claim 9, wherein the means for measuring further comprises:
  means for measuring, via a single-ended algorithm, the objective perceptual quality of the recorded signal.

11. The apparatus of claim 1, wherein the digital protocol is one of file transfer protocol (FTP), simple mail transfer protocol (SMTP), and hypertext transfer protocol (HTTP).

12. The method of claim 7, wherein the sending further comprises:
  sending, via a digital protocol, the recorded signal to a signal processor, wherein the digital protocol is one of file transfer protocol (FTP), simple mail transfer protocol (SMTP), and hypertext transfer protocol (HTTP).

13. The system of claim 9, wherein
  the digital protocol is one of file transfer protocol (FTP), simple mail transfer protocol (SMTP), and hypertext transfer protocol (HTTP).

* * * * *